US012592804B2

(12) United States Patent
Bonde et al.

(10) Patent No.: US 12,592,804 B2
(45) Date of Patent: Mar. 31, 2026

(54) WIRELESS DATA PACKET ACKNOWLEDGMENT SCHEMES

(71) Applicant: Bose Corporation, Framingham, MA (US)

(72) Inventors: Casper Bonde, Stoevring (DK); Rasmus Abildgren, Skørping (DK); Nathan Blagrove, Wayland, MA (US); Somasundaram Meiyappan, Chennai (IN)

(73) Assignee: Bose Corporation, Framingham, MA (US)

( * ) Notice: Subject to any disclaimer, the term of this patent is extended or adjusted under 35 U.S.C. 154(b) by 157 days.

(21) Appl. No.: 18/122,910

(22) Filed: Mar. 17, 2023

(65) Prior Publication Data

US 2023/0299925 A1     Sep. 21, 2023

Related U.S. Application Data

(60) Provisional application No. 63/269,481, filed on Mar. 17, 2022.

(51) Int. Cl.
*H04L 5/00*          (2006.01)
*H04L 1/00*          (2006.01)
(Continued)

(52) U.S. Cl.
CPC .... *H04L 5/0053* (2013.01); *H04L 2001/0093* (2013.01); *H04L 1/1621* (2013.01);
(Continued)

(58) Field of Classification Search
CPC ... H04L 5/0053; H04L 1/1621; H04L 1/1657; H04L 2001/0093; H04L 1/1825; H04R 5/033; H04R 2420/07
See application file for complete search history.

(56) References Cited

U.S. PATENT DOCUMENTS

| | | | |
|---|---|---|---|
| 10,547,927 B1 * | 1/2020 | Clark | H04R 25/554 |
| 12,008,385 B1 * | 6/2024 | Rohit Kumar et al. | |
| | | | G06F 9/44505 |

(Continued)

FOREIGN PATENT DOCUMENTS

| | | | | |
|---|---|---|---|---|
| CN | 112423198 A | * | 2/2021 | H04B 5/00 |
| EP | 4084493 A1 | | 11/2022 | |

(Continued)

OTHER PUBLICATIONS

International Preliminary Report on Patentability, International Application No. PCT/US2023/015529, dated Sep. 10, 2024, pp. 1-7.
(Continued)

*Primary Examiner* — Rebecca E Song
*Assistant Examiner* — Gary A Miller
(74) *Attorney, Agent, or Firm* — Bond, Schoeneck & King, PLLC

(57) ABSTRACT

Methods and systems of acknowledgment of wireless data packets is provided. For example, such a method can include receiving, from a central device, such as a smartphone, at a first peripheral device, such as a left earbud, a first isochronous data stream intended to be received by the first peripheral device. The method further includes receiving, from a central device at a second peripheral device, such as a right earbud, a second isochronous data stream intended to be received by the second peripheral device. In some examples, the second peripheral device is a right earbud. The method further includes eavesdropping, via the second peripheral device, the first isochronous data stream in an attempt to receive a packet of the first isochronous data stream. The method further includes sending, from the second peripheral device, an acknowledgment after the packet has been received by the second peripheral device.

18 Claims, 12 Drawing Sheets

(51) Int. Cl.
    *H04L 1/1607*     (2023.01)
    *H04R 5/033*     (2006.01)

(52) U.S. Cl.
    CPC ............ *H04L 1/1657* (2013.01); *H04R 5/033*
               (2013.01); *H04R 2420/07* (2013.01)

(56) References Cited

U.S. PATENT DOCUMENTS

| | | |
|---|---|---|
| 2021/0279126 A1* | 9/2021 | Linsky ................ G06F 11/1004 |
| 2021/0337610 A1 | 10/2021 | Yu |
| 2021/0385893 A1* | 12/2021 | Jin ......................... H04W 12/55 |
| 2022/0039179 A1* | 2/2022 | Chen .................... H04R 1/1016 |
| 2022/0053599 A1* | 2/2022 | Srivastava ............ H04W 88/14 |
| 2023/0016757 A1* | 1/2023 | Xu ........................... H04R 3/12 |

FOREIGN PATENT DOCUMENTS

| | | | | |
|---|---|---|---|---|
| WO | WO-2021067753 A1 * | 4/2021 | ........... | H04L 1/1812 |
| WO | 2021130909 A1 | 7/2021 | | |
| WO | WO-2023140858 A1 * | 7/2023 | | |

OTHER PUBLICATIONS

International Search Report, International Application No. PCT/US2023/015529, dated Jun. 15, 2023, pp. 1-2.

* cited by examiner

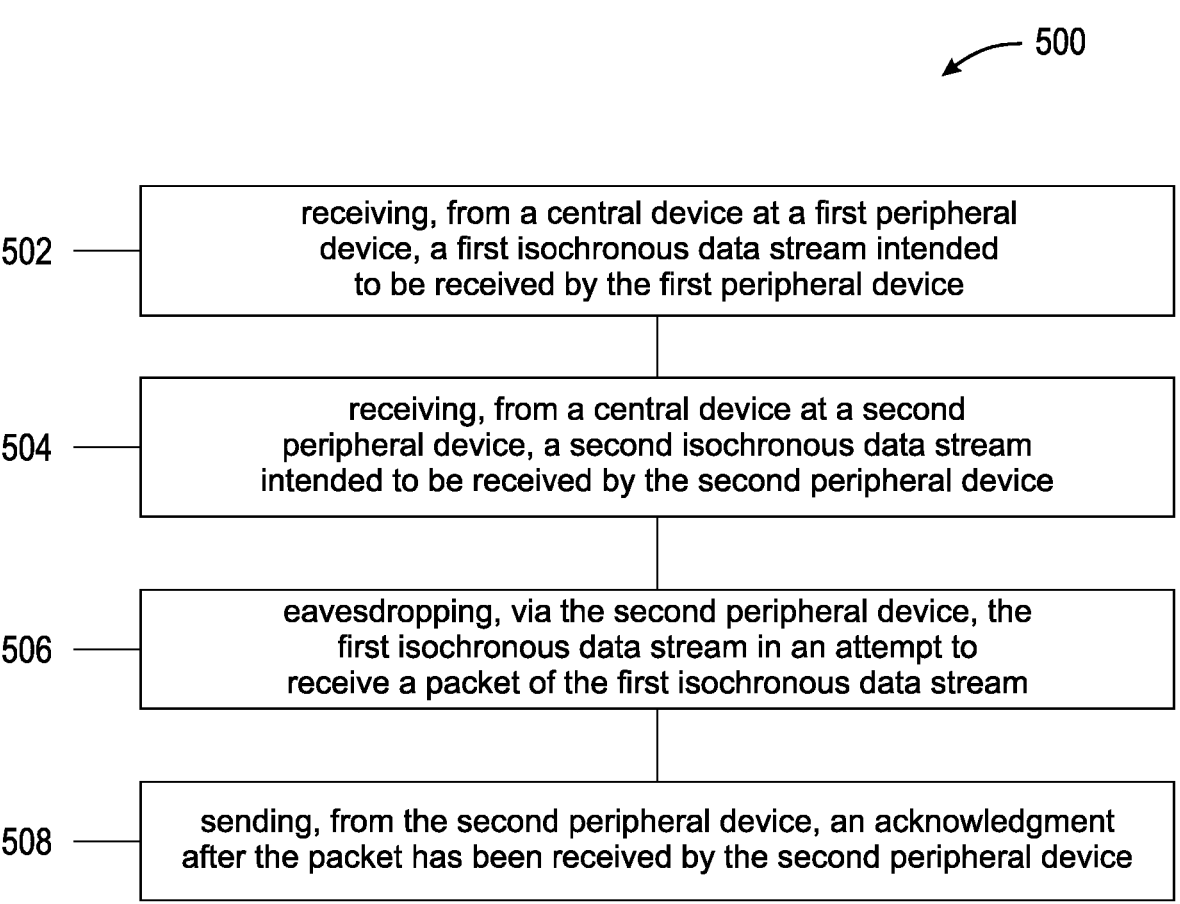

500

502 — receiving, from a central device at a first peripheral device, a first isochronous data stream intended to be received by the first peripheral device 504 — receiving, from a central device at a second peripheral device, a second isochronous data stream intended to be received by the second peripheral device 506 — eavesdropping, via the second peripheral device, the first isochronous data stream in an attempt to receive a packet of the first isochronous data stream 508 — sending, from the second peripheral device, an acknowledgment after the packet has been received by the second peripheral device

Fig. 12

WIRELESS DATA PACKET ACKNOWLEDGMENT SCHEMES

CROSS-REFERENCE TO RELATED APPLICATIONS

This application claims priority to and benefit of U.S. Provisional Patent Application No. 63/269,481 filed Mar. 17, 2022, the contents of which are herein incorporated by reference in their entirety.

BACKGROUND

Aspects and implementations of the present disclosure are generally directed to Bluetooth-based systems and methods for acknowledging the reception of wireless packets.

In existing wireless transmission schemes, a central device transmits packets. If the packets are successfully received by a peripheral device, the peripheral device responds by transmitting an acknowledgment to the central device. However, if the central device fails to receive a portion of the data, or if a portion of the data is incomplete or corrupted, the peripheral device will either (1) forego transmitting the acknowledgment or (2) transmit a negative acknowledgment. In this case, the central device responds to the lack of acknowledgment or negative acknowledgment by retransmitting the lost, incomplete, or corrupted portion of the data to ensure the peripheral device receives all of the data. The retransmission may repeat until the central device receives an acknowledgment from the peripheral device.

SUMMARY

The present disclosure provides improved systems and methods of wireless packet acknowledgment. In particular, these improved systems and methods enable wireless audio devices, such as a pair of earbuds, to acknowledge receipt of packets, and initiate retransmission of unreceived or corrupted packets when necessary. This acknowledgment scheme enables the wireless audio devices to implement spatialized audio. Generally, a central device, such as a smartphone, transmits a first isochronous data stream and a second isochronous data stream. The first and second isochronous data streams are typically Bluetooth Low Energy (LE) Audio Connected Isochronous data streams (CISs). Further, the first and second isochronous data streams typically include first audio channel data and second audio channel data, respectively. The first audio channel data typically corresponds to a left channel or a right channel of a stereo pair, while the second audio channel data typically corresponds to the other channel.

The first isochronous data stream is intended to be received by a first peripheral device (such as a first earbud), while the second isochronous data stream is intended to be received by a second peripheral device (such as a second earbud). During transmission, the second peripheral device eavesdrops on the first isochronous data stream in an attempt to receive a packet of the first isochronous data stream. The second peripheral device then transmits an acknowledgment or negative acknowledgment based on whether the packet was received by the second peripheral device. If the second device fails to transmit an acknowledgment (or transmits a negative acknowledgment), the central device retransmits the packet. This retransmission may repeat until the second device acknowledges successful reception of the packet.

In some examples, the system selects either the first peripheral device or the second peripheral device to acknowledge the receipt of audio data on behalf of the other. In particular, this scheme may be implemented in situations where the link quality between the central device and one of the peripheral devices is much weaker than the other. Thus, if the peripheral device associated with weaker link quality successfully acknowledges receipt of the transmitted packets, the other peripheral device almost certainly received the transmitted packets. Therefore, only one peripheral device is required to acknowledge receipt, improving system efficiency. In alternative examples, a programmable pattern may be used to designate which peripheral device is providing acknowledgment. In these examples, the acknowledging peripheral device may alternate periodically, such as every one, two, or three subevents.

In some examples, the retransmission of unreceived data packets occurs between the first and second peripheral devices, rather than between the central device and one of the peripheral devices. In these examples, the second peripheral device transmits the acknowledgment or negative acknowledgment to the first peripheral device. If the first peripheral device receives a negative acknowledgment, or if it fails to receive an acknowledgement, it will transmit the data packet from the first isochronous data stream to the second peripheral device. In further examples, the second peripheral device transmits block acknowledgments representative of receiving or not receiving several data packets. Upon receiving the block acknowledgment, the first peripheral device will transmit the data packets not received by the second peripheral device.

Generally, a method of acknowledgment of wireless data packets is provided. The method includes receiving, from a central device at a first peripheral device, a first isochronous data stream intended to be received by the first peripheral device. In some examples, the central device is a smartphone. In some examples, the first peripheral device is a left earbud.

The method further includes receiving, from a central device at a second peripheral device, a second isochronous data stream intended to be received by the second peripheral device. In some examples, the second peripheral device is a right earbud.

According to an example, the first isochronous data stream includes first audio channel data, and the second isochronous data stream includes second audio channel data. The second audio channel data may be different from the first audio channel data. The first audio channel data may relate to one of a left channel or a right channel of a stereo pair, and the second audio channel data may relate to the other of the left channel or the right channel of the stereo pair. The first audio channel data may not be included in the second isochronous data stream.

According to an example, the first isochronous data stream may further include third audio channel data. The first audio channel data, the second audio channel data, and the third audio channel data may each relate to one of a plurality of audio channels of a surround sound system.

According to an example, the first isochronous data stream and the second isochronous data stream are each a Bluetooth LE Audio CIS.

The method further includes eavesdropping, via the second peripheral device, the first isochronous data stream in an attempt to receive a packet of the first isochronous data stream.

The method further includes sending, from the second peripheral device, an acknowledgment based on whether the packet was received by the second peripheral device. In some examples, the method further includes sending, from the second peripheral device, a negative acknowledgment in response to the second peripheral device failing to receive the packet. In other examples, the method further includes not sending, from the second peripheral device, the acknowledgement in response to the second peripheral device failing to receive the packet.

According to an example, the sending of the acknowledgment is from the second peripheral device to the central device. Further to this example, the sending of the acknowledgment is in place of an acknowledgment being sent from the first peripheral device to the central device. The sending of the acknowledgment may occur when a link quality between the central device and the second peripheral device is relatively weaker than a link quality between the central device and the first peripheral device. Further, the sending of the acknowledgment may be based on a pattern wherein the first peripheral device and the second peripheral device alternate sending an acknowledgment. The pattern may alternate after every one, two, or three packet transmission subevents.

According to an example, the sending of the acknowledgment may be from the second peripheral device to the first peripheral device. In this example, the method may further comprise sending, from the second peripheral device, a negative acknowledgment to the first peripheral device in response to the second peripheral device failing to receive the packet. In response to the negative acknowledgment, the first peripheral device retransmits the packet to the second peripheral device.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

FIG. 12 is a flowchart of a method for wireless data packet acknowledgment, according to an example.

DETAILED DESCRIPTION

In audio systems including two devices (such as a set of truly wireless earbuds), one device will typically receive one channel of audio data (such as a left channel of a stereo pair), and the other device will typically receive a different channel of audio data (such as a right channel of the stereo pair). If the devices wish to spatialize the audio in some manner, then each device would need to receive more than the single channel. For instance, for a set of truly wireless earbuds, the right bud would need to receive its right channel as well as the left channel transmitted to the left bud, and the left bud would need to receive its left channel as well as the right channel that is transmitted to the right bud. This would allow audio to be spatialized by the buds (as opposed to having pre-spatialized audio sent to the buds), which can enable using data from the buds themselves to help with the audio spatialization (such as using data from onboard inertial measurement units (IMUs), accelerometers, or gyroscopes). However, existing acknowledgment schemes are unable to provide sufficient acknowledgment of receipt of left and right audio channels by both devices within the timing required for spatialized audio. Accordingly, the present disclosure describes techniques for improving wireless packet acknowledgment schemes, which can be used in the context of spatialized audio.

The present disclosure provides improved systems and methods of wireless packet acknowledgment. In particular, these improved systems and methods enable wireless audio devices to acknowledge receipt of packets, and initiate retransmission of unreceived or corrupted packets when necessary. This acknowledgment scheme enables the wireless audio devices to implement spatialized audio. Generally, a central device transmits a first isochronous data stream and a second isochronous data stream. The first and second isochronous data streams are typically Bluetooth Low Energy (LE) Audio Connected Isochronous data streams (CISs). Further, the first and second isochronous data streams typically include first audio channel data and second audio channel data, respectively. The first audio channel data typically corresponds to a left channel or right channel of a stereo pair, while the second audio channel data typically corresponds to the other channel.

Figure 1:
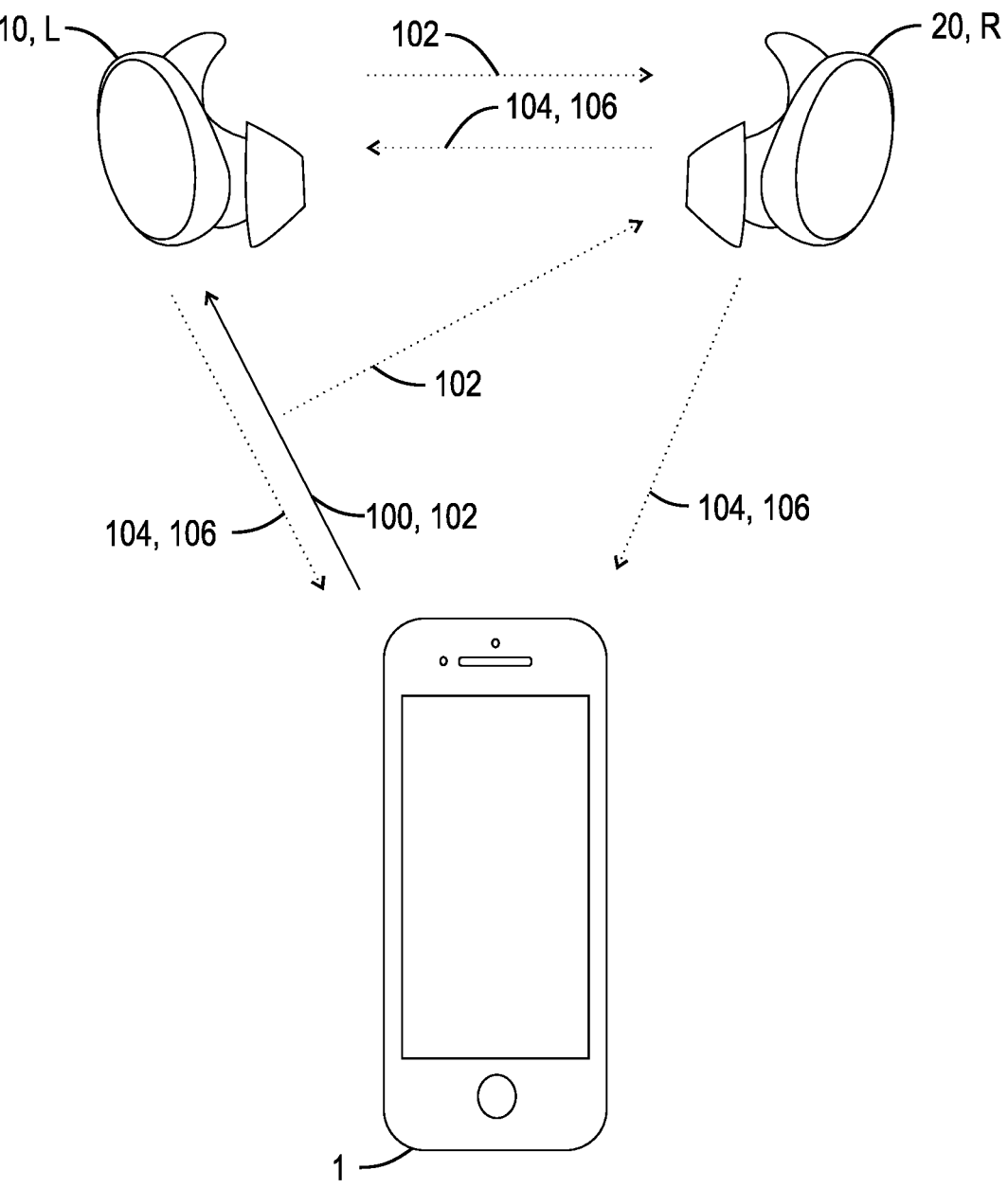
FIG. 1 is an illustration of a system configured for wireless packet acknowledgment, according to an example.

FIG. 1 shows an example system implementing wireless data packet acknowledgment. The system includes a central device 1, a first peripheral device 10, and a second peripheral device 20. In FIG. 1, the central device 1 is illustrated as a smartphone, but in other examples, the central device may be any device capable of transmitting wireless packets, such as a personal computer, tablet, smart television, stereo receiver, soundbar, etc. Further, in FIG. 1, the first peripheral device 10 is illustrated as a left earbud, while the second peripheral device 20 is illustrated as a right earbud. In other examples, the first peripheral device 10 and the second peripheral device 20 may form other types of wearable audio devices, such as a pair of headphones, an audio headset, or audio eyeglasses. In other examples, the first peripheral device 10 and the second peripheral device 20 may be non-wearable audio devices, such as a pair of stereo loudspeakers.

A first isochronous data stream 100 is formed between the central device 1 and the first peripheral device 10. In some examples, the first isochronous data stream 100 is a Bluetooth stream, such as a Bluetooth LE Audio CIS. The first isochronous data stream 100 conveys packets 102 from the central device 1 to the first peripheral device 10. In some examples, the packets 102 include first audio channel data 112. In further examples, the first audio channel data 112 can relate to either a left channel or a right channel of a stereo pair.

The first peripheral device 100 may respond to the transmission of packets 102 via the first isochronous data stream 100 in several ways. First, upon successful receipt of a packet 102, the first peripheral device 100 wirelessly transmits an acknowledgment 104 to the central device 1. This acknowledgment 104 indicates that the corresponding packet 102 was successfully transmitted and received, and further retransmission of the packet 102 is unnecessary. However, in some cases, the packet 102 may not be successfully received by the first peripheral device 10. In this case, the first peripheral device 10 either omits the transmission of the acknowledgment 104, or transmits a negative acknowledgment 106. For example, if the first peripheral device 100 receives a corrupted version of the packet 102, the first peripheral device 10 may transmit the negative acknowledgment 106. Further, if the first peripheral device 10 doesn't receive any version of the packet 102, the first peripheral device 10 may omit transmission of the acknowledgment 104. The central device 1 may recognize the lack of acknowledgment from the first peripheral device 10 due to the timing of the first isochronous stream 100. If the central device 1 fails to receive an acknowledgment 104, or if it receives a negative acknowledgment 106, the central device 1 retransmits the packet 102, via the first isochronous data stream 100, to the first peripheral device 10. In some examples, the central device 1 may continually retransmit the packet 102 until the central device 1 receives a corresponding acknowledgment 104.

As further illustrated in FIG. 1, the second peripheral device 20 eavesdrops on the first isochronous data stream 100 to attempt to capture the packets 102 conveyed by the first isochronous data stream 100. This eavesdropping may be enabled by the central device 1 or the first peripheral device 10 sharing credentials or other information corresponding to the first isochronous data stream 100 with the second peripheral device 20. Similar to the first peripheral device 10, the second peripheral device 20 may generate acknowledgments 104 or negative acknowledgments 106 corresponding to receiving (or failing to receive) the packets 102. As will be described in further detail below with reference to FIGS. 5-9, the negative acknowledgments 106 or lack of acknowledgments 104 may be received or recognized by either the central device 1 or the first peripheral device 10, depending on the configuration of the system. The negative acknowledgments 106 or lack of acknowledgments 104 may then cause either central device 1 or the first peripheral device 10 to retransmit the packets 102 that the second peripheral device 20 failed to successfully receive. The central device 1 or the first peripheral device 10 may recognize the lack of acknowledgment from the second peripheral device 20 due to the timing of the first isochronous stream 100.

Figure 2:
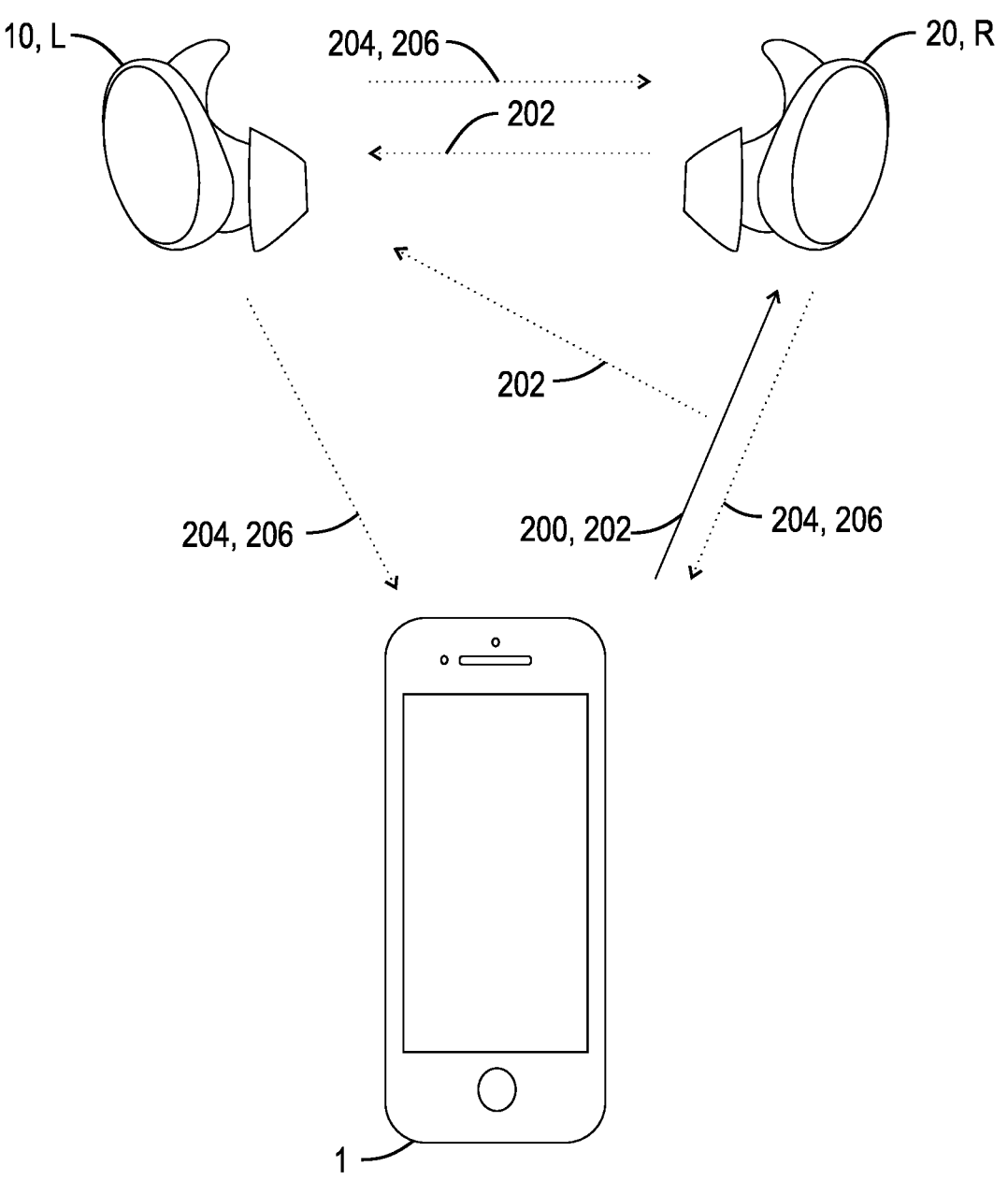
FIG. 2 is an illustration of a system configured for wireless packet acknowledgment, according to a further example.

In order for the second peripheral device 20 to eavesdrop on the first isochronous data stream 100 (or for the first peripheral device 10 to eavesdrop on the second isochronous data stream 200 as illustrated in FIG. 2), the first 10 and second 20 peripheral devices must exchange information so that the second peripheral device 20 knows when to eavesdrop. Further, the first 10 and second 20 peripheral devices must negotiate a pattern for transmitting acknowledgments 104 and negative acknowledgments 106 to the central device 1. This pattern may dynamically change over time, but a communication channel must exist between the first 10 and second 20 peripheral devices to facilitate this negotiation. The central device 1 will not perceive any difference between an acknowledgement 104 sent from the first peripheral device 10 or the second peripheral device 20, as, due to the negotiation, both peripheral devices 10, 20 will send acknowledgments 104 at the proper time and on the proper frequency.

The negotiation ensures that only one peripheral device 10, 20 transmits at a time on the proper frequency. Different patterns of acknowledgment may be used depending on a variety of factors, such as radio frequency (RF) condition, the number of packet retransmission opportunities, the battery level of the peripheral devices 10, 20, and/or other receive or transmit commitments of the peripheral devices. Some example acknowledgement schemes, where P1 represents the first peripheral device 10, and P2 represents the second peripheral device 20, include P1 P1 P1 P1, P1 P1 P2 P2, P1 P2 P1 P2, P1 P1 P1 P2, etc.

FIG. 2 shows another aspect of the system illustrated in FIG. 1. While FIG. 1 illustrates the conveyance of packets 102 via the first isochronous data stream 100, FIG. 2 illustrates the conveyance of packets 202 via the second isochronous data stream 200. The second isochronous data stream 200 is formed between the central device 1 and the second peripheral device 20. As with the first isochronous data stream 100, the second isochronous data stream 200 may be a Bluetooth stream, such as a Bluetooth LE Audio CIS. In some examples, the packets 202 include second audio channel data 114. In further examples, the second audio channel data 114 can relate to either a left channel or a right channel of a stereo pair, preferably the opposite of the first audio channel data 112 conveyed by the first isochronous data stream 100.

Upon successful receipt of the packet 202, the second peripheral device 20 transmits an acknowledgment 204 to the central device 1. Otherwise, the second peripheral device 20 either omits the transmission of the acknowledgment 204, or transmits a negative acknowledgment 206. If the central device 1 fails to receive an acknowledgment 204, or if it receives a negative acknowledgment 206, the central device 1 retransmits the packet 202, via the second isochronous data stream 200, to the second peripheral device 20. The central device 1 may recognize the lack of acknowledgment from the second peripheral device 20 due to the timing of the second isochronous stream 200.

The first device 10 eavesdrops on the second isochronous data stream 200 to attempt to capture the packets 202 conveyed by the second isochronous data stream 200. The second peripheral device 20 may then generate acknowledgments 104 or negative acknowledgments 106 corresponding to receiving (or failing to receive) the packets 202. The negative acknowledgments 206 (or lack of acknowledgments 204) may be received (or recognized) by either the central device 1 or the second peripheral device 20, depending on the configuration of the system. The negative acknowledgments 206 or lack of acknowledgments 204 may then trigger either central device 1 or the second peripheral device 20 to retransmit the packets 202 that the first peripheral device 10 failed to successfully receive via the eavesdropping. The central device 1 or the second peripheral device 20 may recognize the lack of acknowledgment from the first peripheral device 10 due to the timing of the second isochronous stream 200.

The arrangements described above with reference to FIGS. 1 and 2 enable the implementation of spatialized audio, as each peripheral device 10, 20 receives packets 102, 202 from both isochronous data streams 100, 200. These packets 102, 202 contain first and second audio channel data 112, 114, thus enabling each peripheral device 10, 20 to receive both right and left channel audio. By receiving both left and right channel audio, the processors 17, 27 of the peripheral devices 10, 20 may generate spatialized audio signals using both left and right audio channels, as well as other inputs, such as data collected by accelerometers, gyroscopes, and/or additional sensors. These spatialized audio signals may be played to the users via acoustic transducers 11, 21.

In some examples, the spatialized audio signals are generated based on more than two audio channels. For instance, a surround sound system (such as 2.1 surround sound or 5.1 surround sound) may have several channels. In these cases, the packets 102, 202 may include data corresponding to more than one audio channel. For example, each packet 102 of the first isochronous data stream 100 may include first audio channel data 112 and/or third audio channel data 116, while each packet 202 of the second isochronous data stream may include second audio channel data 114. In this example, each type of audio channel data 112, 114, 116 may represent one of three different speakers in a surround sound system. For the first audio channel data 112 may correspond to a left treble speaker, the second audio channel data 114 may correspond to a right treble speaker, and the third audio channel data 116 may correspond to a center bass speaker. The processors 17, 27 of the peripheral devices 10, 20 then use the third audio channel data 116 along with the other audio channel data 112, 114 and additional inputs to generate spatialized audio signals.

In a further example, the acknowledgment scheme may be configured for more than two isochronous data streams. For example, the central device 1 could form a first isochronous data stream 100 with the first peripheral device 10, a second isochronous data stream 200 with the second peripheral device 20, and a third isochronous data stream with the first peripheral device 10 or the second peripheral device 20. The third isochronous data stream may be configured to convey the third audio channel data 116 described above, or other types of data, depending on the application. Additional isochronous data streams may be utilized where appropriate. As demonstrated in FIGS. 4-9, the transmission of packets by the isochronous streams must be coordinated to avoid interference.

Figure 3:
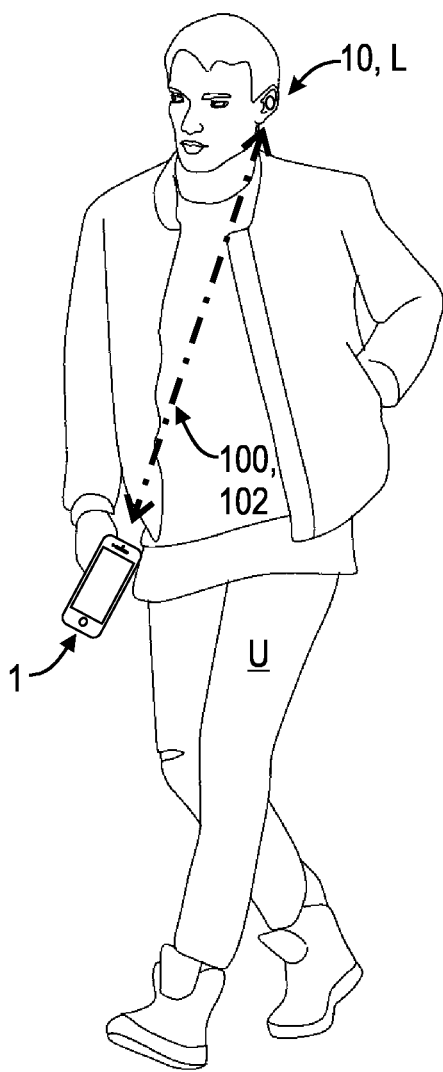
FIG. 3 is an illustration demonstrating the cross-body effect, according to an example.

FIG. 3 is an illustration demonstrating the cross-body effect. As shown in FIG. 3, a user U is carrying a central device 1, embodied as a smartphone, in his right hand. The user U is also wearing a first peripheral device 10, embodied as a left earbud, in his left ear. A first isochronous data stream 100 conveys packets 102 from the central device 1 to the first peripheral device 10. However, because the shortest path of the first isochronous data stream 100 travels through the user U, the first isochronous data stream 100 may experience packet losses (and other effects) due to the physical structure of the body of the user U. Accordingly, packets 102 conveyed via the first isochronous data stream 100 may need to be retransmitted due to the cross-body effect.

Figure 4:
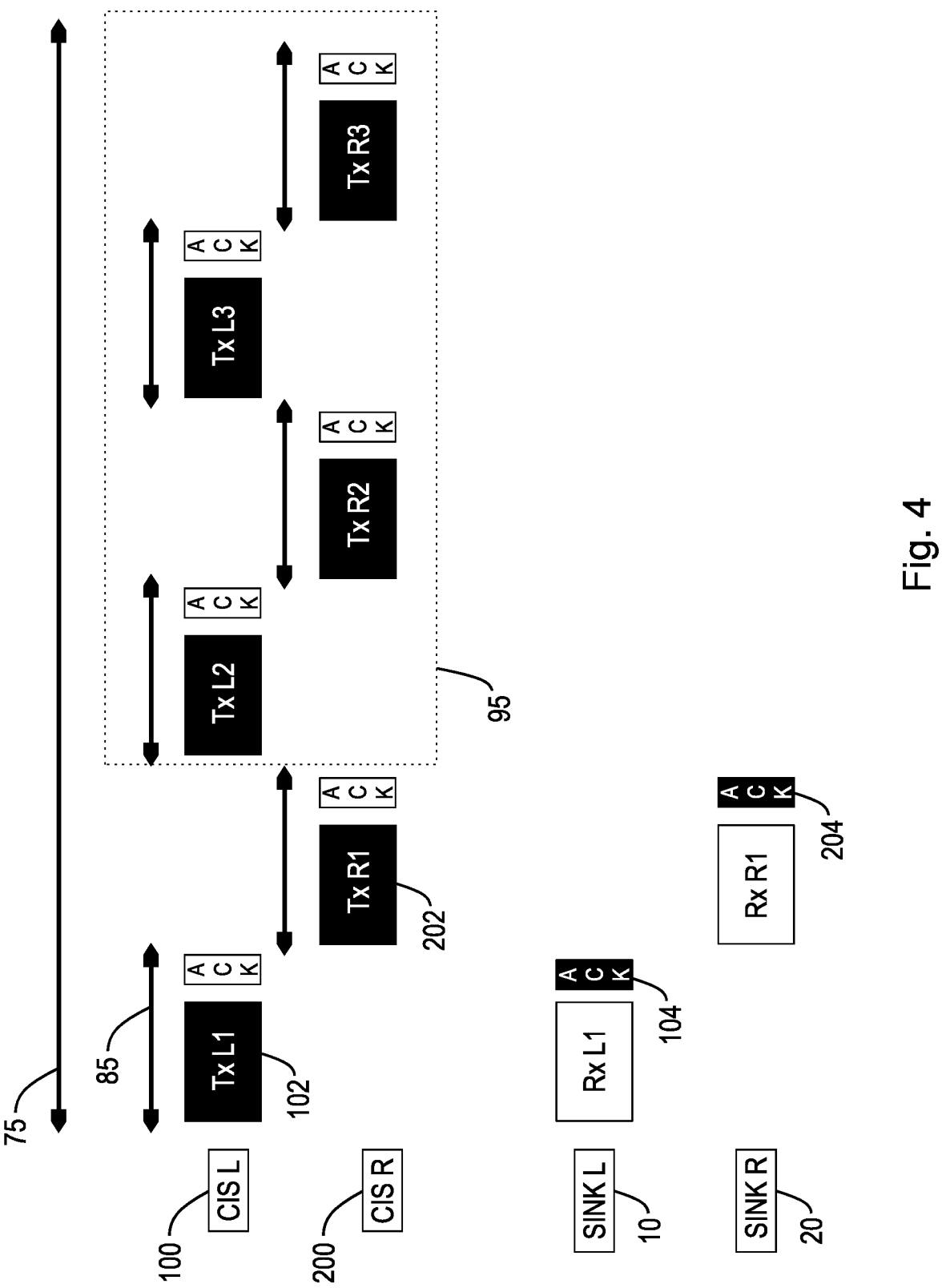
FIG. 4 is a flow diagram of a system configured for wireless packet acknowledgment, according to an example.

FIG. 4 is a flow diagram of an interleaved scheme for wireless packet acknowledgment. As shown in FIG. 4, the system includes a first isochronous data stream 100 configured to convey a packet 102 corresponding to a left stereo channel, and a second isochronous data stream 200 configured to convey a packet 202 corresponding to a right stereo channel. The packets 102, 202 are transmitted by central device 1, not shown. The isochronous data streams 100, 200 alternate conveying packets 102, 202 during a CIS interval 75. The CIS interval is divided into a series of subevents 85. In each subevent 85, one of the isochronous data streams 100, 200 transmits a packet 100, 200, and one of the peripheral devices 10, 20 responds by transmitting an acknowledgment 104, 204 or negative acknowledgment 106, 206. By alternating the transmission of packets 102, 202 according to the subevents 85, the interleaved scheme prevents the packets 102, 202 and acknowledgments 104, 204 from interfering with each other.

Starting on the left side of the diagram, the first isochronous data stream 100 transmits a packet 102, designated L1 for left stereo audio channel, during the first subevent 85. L1 is received by the first peripheral device 10. In response to receiving L1, the first peripheral device 10 transmits an acknowledgment 104. This acknowledgment 104 is received by the central device 1. The acknowledgment 104 configures the central device 1 to stop transmitting the packet 102, as it has been successfully received by the first peripheral device 10.

During the second subevent 85, the second isochronous data stream 100 transmits a packet 202, designated R1 for right stereo audio channel. R1 is received by the second peripheral device 20. In response to receiving R1, the second peripheral device 20 transmits an acknowledgment 204. This acknowledgment 204 is received by the central device 1. The acknowledgment 204 configures the central device 1 to stop transmitting the packet 202, as it has been successfully received by the second peripheral device 20.

However, if the central device 1 fails to receive an acknowledgment 104, 204 from either of the peripheral devices 10, 20, the central device 1 may retransmit one or both of the packets 102, 202 during a retransmission period 95 of the CIS interval 75. For example, if the central device 1 fails to receive an acknowledgment 104 of the first peripheral device 100 receiving the packet 102, the central device 1 will retransmit the packet 102 via the first isochronous data stream 100 during the third subevent 95. In this example, the retransmitted packet 102 is designated L2. If L2 is not received by the first peripheral device 10, L3 will be transmitted during the fifth subevent 95. Similarly, if central device 1 fails to receive an acknowledgment 204 of the second peripheral device 20 receiving the packet 202, the central device will retransmit the packet 202 via the second isochronous data stream 200 during the fourth subevent. In this example, the retransmitted packet 202 is designated R2. If R2 is not received by the second peripheral device 20, R3 will be transmitted during the sixth subevent 95.

The central device 1 may recognize the lack of acknowledgment from the first peripheral device 10 due to the timing of the first isochronous stream 100. For example, if a subevent 85 has expired and the central device 1 has not received an acknowledgment 104 from the first peripheral device 10, the central device 1 recognizes that the first peripheral device 10 did not successfully receive the transmitted packet 102, triggering future retransmission of the packet 102. Similarly, the central device 1 may recognize the lack of acknowledgment from the second peripheral device 20 due to the timing of the second isochronous stream 200. If a subevent 85 has expired and the central device 1 has not received an acknowledgment 204 from the second peripheral device 20, the central device 1 recognizes that first peripheral device 10 did not successfully receive the transmitted packet 102, triggering future retransmission of the packet 102.

Figure 5:
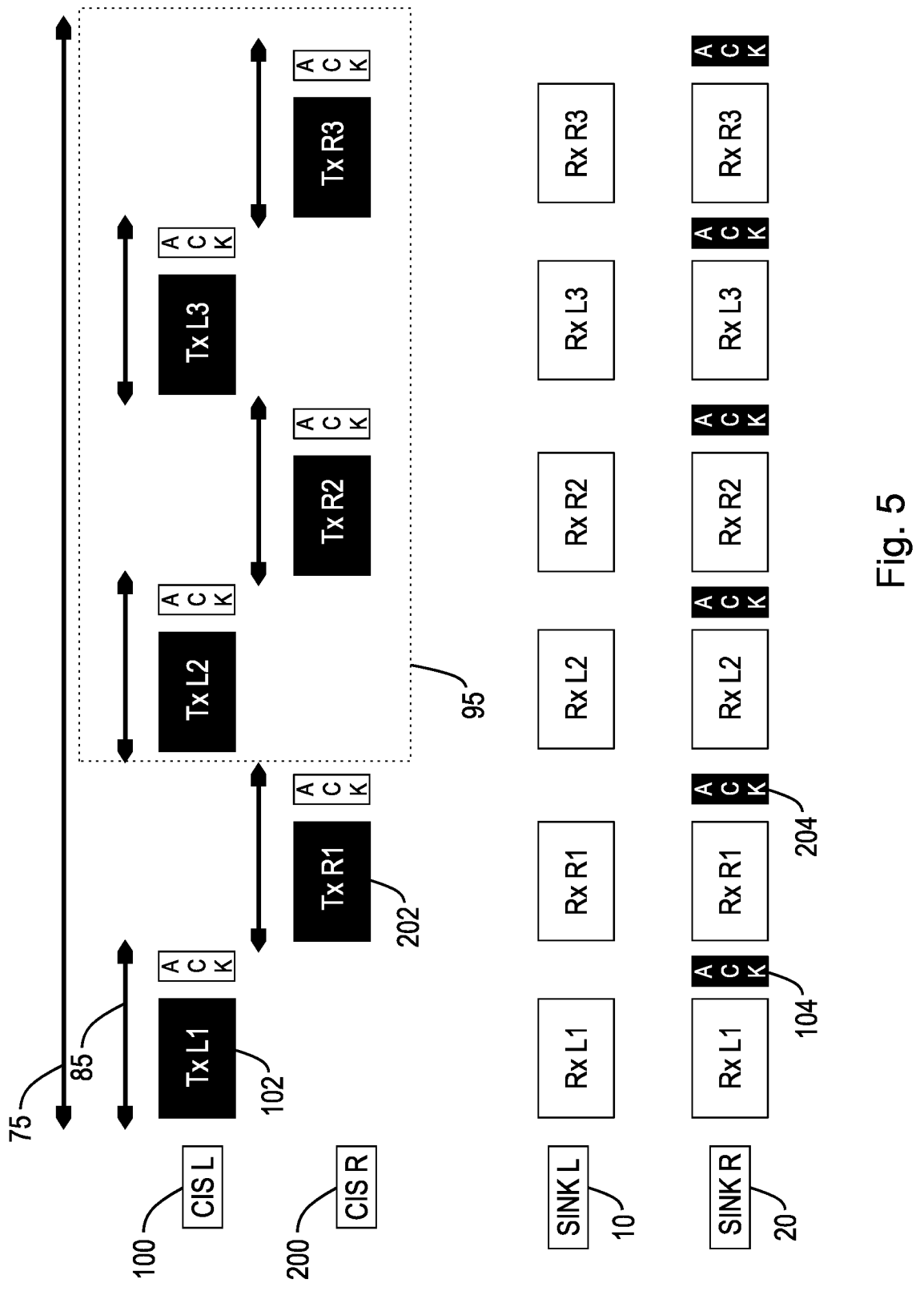
FIG. 5 is a flow diagram of a system configured for wireless packet acknowledgment wherein only one peripheral device transmits acknowledgments, according to an example.

FIG. 5 illustrates a variation of FIG. 4 in which each of the peripheral devices 10, 20 eavesdrop on the isochronous data stream 100, 200 transmitting a packet 102, 202 to the other peripheral device 10, 20. More specifically, during the first subevent 85, the first isochronous data stream 100 transmits packet 102, designated L1. L1 is received by the first peripheral device 10 via the first isochronous data stream 100. However, the second peripheral device 20 eavesdrops on the first isochronous data stream 100 to also receive L1. Similarly, during the second subevent, the second isochronous data stream 200 transmits packet 202, designated R1. R1 is received by the second peripheral device 20 via the second isochronous data stream 200. The first peripheral device 10 eavesdrops on the second isochronous data stream 200 to also receive R1. Accordingly, both peripheral devices 10, 20 receive packets 102, 202 from both isochronous data streams 100, 200 to enable spatialized audio.

However, with both peripheral devices 10, 20 receiving both packets 102, 202, the acknowledgment scheme must provide a method for acknowledging the receipt of the packets 100, 200 and to trigger retransmission when necessary. The configuration of FIG. 5 relies on determining a first link quality 120 between the central device 1 and the first peripheral device 10, and a second link quality 220 between the central device 1 and the second peripheral device 20. These link qualities 120, 220 may be determined by the transceivers 13, 23 and processors 17, 27 embedded within each peripheral device 10, 20. Alternatively, the link qualities 120, 220 may be determined by one or more components of the central device 1.

These link qualities 120, 220 may also be shared between the central device 1 and the peripheral devices 10, 20 to enable proper selection of an acknowledgment device. The acknowledgment device is the peripheral device 10, 20 chosen to provide acknowledgments 104, 204 (and/or negative acknowledgments 106, 206) to the central device 1 in response to receiving the packets 102, 202. In one example, the peripheral device 10, 20 corresponding to the lower link quality is chosen as the acknowledgment device. For example, if a user carries a central device 1 (smartphone) in their left hand, wears a first peripheral device 10 (left earbud) in their left ear, and wears a second peripheral device 20 (right earbud) in their right ear, the first link quality 120 between the central device 1 and the first peripheral device 10 will likely be significantly higher than the second link quality 220 between the central device 1 and the second peripheral device 20 due to the cross-body effect. Thus, if, despite the low link quality 220, the second device 20 successfully received the packets 102, 202 transmitted by the central device 1, it is highly probable that the first peripheral device 10 also successfully received the packets 102, 202. Accordingly, the second peripheral device 20 is designated as the acknowledgment device configured to transmit acknowledgments 104, 204 to the central device 1 when the packets 102, 202 are successfully received.

In some examples, the designation of the acknowledgment device may dynamically change during the CIS interval 75. For example, if the user U moves the central device 1 from their left hand to their right back pocket, the first link quality 120 will become significantly lower than the second link quality 220. Accordingly, the devices 1, 10, 20 in the system may be configured to dynamically determine the link qualities 120, 220 during streaming, and switch designation of acknowledgment device when appropriate.

Figure 6:
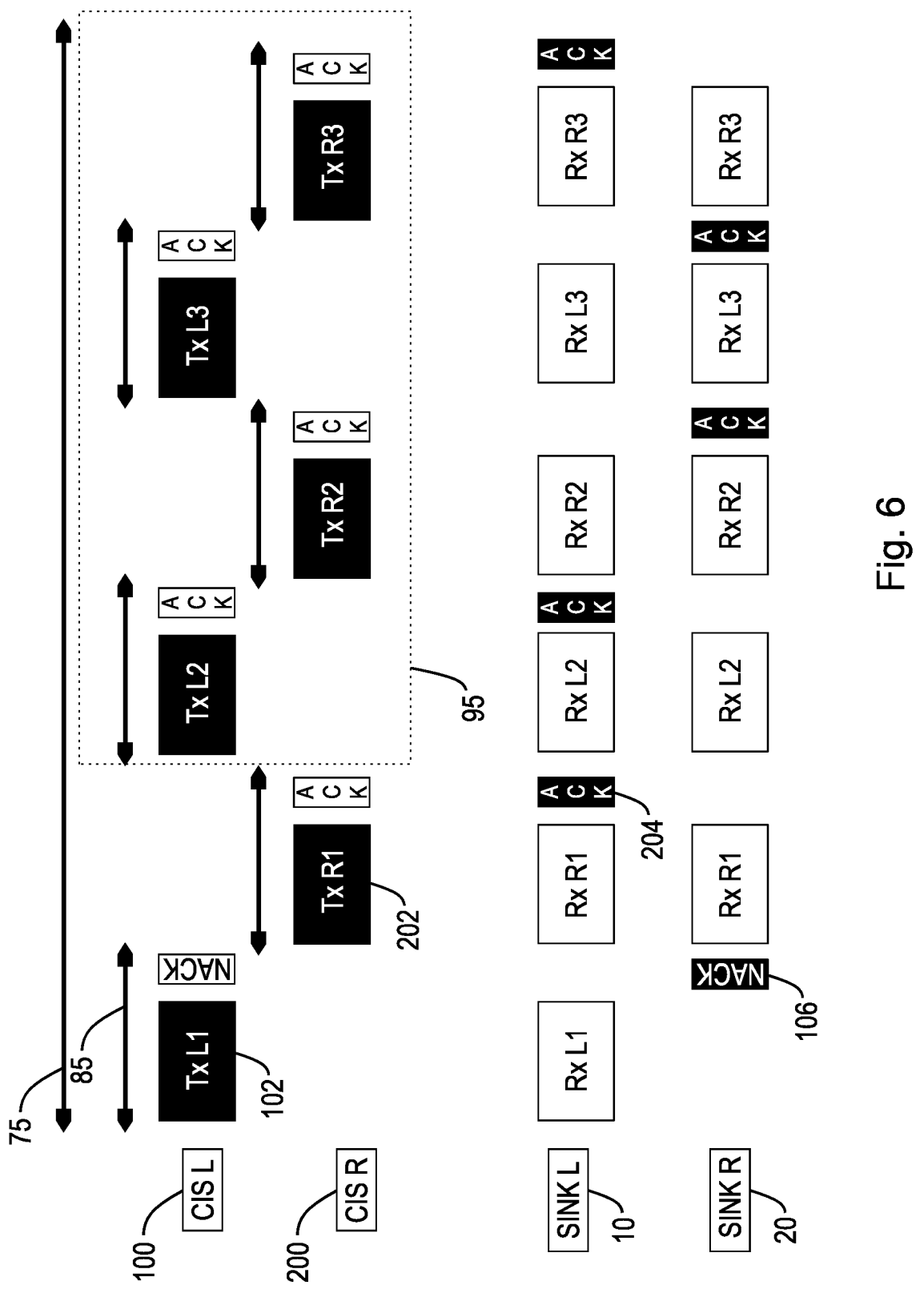
FIG. 6 is a flow diagram of a system configured for wireless packet acknowledgment wherein the peripheral devices alternate transmitting acknowledgments, according to an example.

FIG. 6 illustrates a further variation of FIGS. 4 and 5. In FIG. 5, the acknowledgment device was chosen based on a comparison of the link qualities 120, 220 between the central device 1 and the peripheral devices 10, 20. In the example of FIG. 6, the acknowledgment device for each subevent 85 is selected based on a pattern 130 which alternates between the first peripheral device 10 and the second peripheral device 20. In some examples, the pattern 130 may be predetermined and stored in the memories 15, 25 of the peripheral devices 10, 20. In further examples, the pattern 130 may be dynamically adjusted based on a wide array of factors, including the link qualities 120, 220 between the central device 1 and the peripheral devices 10, 20. As shown in FIG. 6, the first peripheral device 10 is used as the acknowledgment device during the second, third, and sixth subevents 85. The second peripheral device 20 is used as the acknowledgment device during the first, fourth, and fifth subevents 85.

During the first subevent 85, packet 102, designated L1, is conveyed by the first isochronous data stream 100 to the first peripheral device 10. The first peripheral device 10 successfully receives the packet 102. However, the second peripheral device 20 attempts to capture the packet 102 via eavesdropping and fails. Since the second peripheral device 20 is designated as the acknowledgment device, the second device 20 transmits a negative acknowledgment 106 to the central device 1. Having received the negative acknowledgment 106, the central device 1 now knows to retransmit the packet 102, even though the packet 102 was successfully received by the first peripheral device 10.

During the second subevent 85, packet 202, designated R1, is conveyed by the second isochronous data stream 100 to the second peripheral device 20. The second peripheral device 20 successfully receives the packet 202. Further, the first peripheral device 10 eavesdrops the second isochronous data stream 200 and successfully receives the packet 202.

Since the first peripheral device 10 is designated as the acknowledgment device in the second subevent 85, the first peripheral device 10 transmits an acknowledgment 204 to the central device 1. Upon successfully receiving the acknowledgment 204, the central device 1 will not retransmit the packet 202.

During the third subevent 85, packet 102 is retransmitted by the central device 1. Retransmitted packet 102 is designated L2. Even though it successfully received L1, the first peripheral device 10 successfully receives L2. Further, after failing to receive the packet 102, the second peripheral device 20 now successfully receives L2. However, according to the pattern 130, the first peripheral device 10 is now selected as the acknowledgment device, and transmits the acknowledgment 104 to the central device 1. Thus, the reception of the packet 102 by the second peripheral device 20 during the third subevent is irrelevant to the acknowledgment scheme. Upon successfully receiving the acknowledgment 204, the central device 1 will not retransmit the packet 202.

Figure 7:
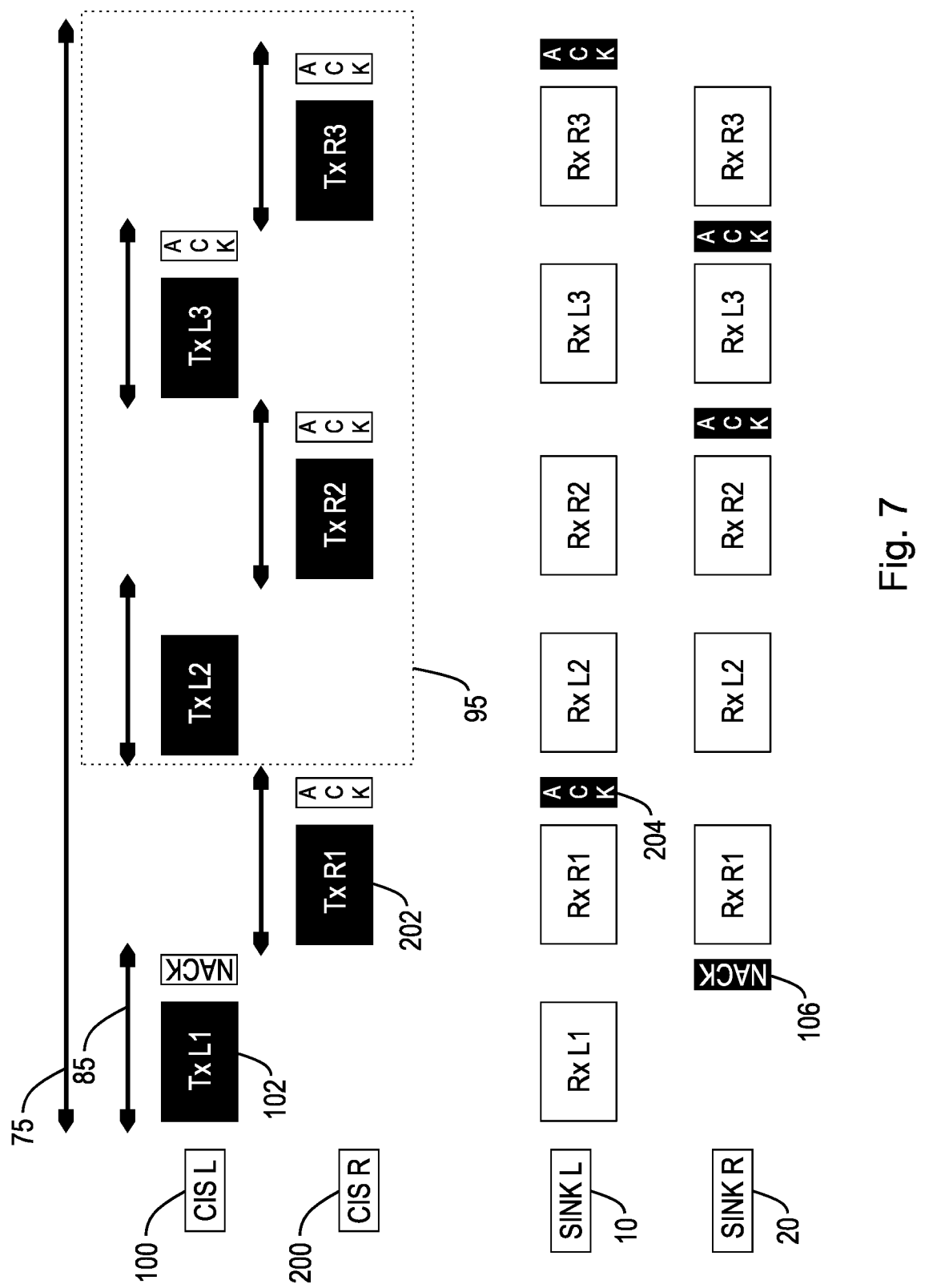
FIG. 7 is a flow diagram of a system configured for wireless packet acknowledgment wherein the peripheral devices alternate transmitting acknowledgments, according to a further example.

FIG. 7 is a further variation of the pattern-based acknowledgment scheme of FIG. 6. In the example of FIG. 7, when the acknowledgment device transmits an acknowledgment 104, 204 or negative acknowledgment 106, 206, the other peripheral device 10, 20 eavesdrops on this transmission to learn whether or not the acknowledgment device successfully received the packet 102, 202. If not, the other peripheral device 10, 20 will be configured to not transmit an acknowledgment 104, 204 based on successfully receiving the packet 102, 202, thus forcing retransmission of the packet 102, 202 until the initially chosen acknowledgment device successfully acknowledges receipt of the packet 102, 202. This variation may be implemented in pattern-based acknowledgment schemes and if the link quality between the initial acknowledgment device and the central device 1 is significantly lower than the link quality between the other peripheral device and the central device 1.

During the first subevent 85, packet 102, designated L1, is conveyed by the first isochronous data stream 100 to the first peripheral device 10. The first peripheral device 10 successfully receives the packet 102. However, as with FIG. 6, the second peripheral device 20 attempts to capture the packet 102 via eavesdropping and fails. Since the second peripheral device 20 is designated as the acknowledgment device, the second device transmits a negative acknowledgment 106 to the central device 1. Having received the negative acknowledgment 106, the central device 1 now knows to retransmit the packet 102, even though the packet 102 was successfully received by the first peripheral device 10. Further, the first peripheral device 10 eavesdrops on the transmission of the negative acknowledgment 106, and now knows that the second peripheral device 20 failed to receive the packet 102.

During the second subevent 85, packet 202, designated R1, is conveyed by the second isochronous data stream 200 to the second peripheral device 20. The second peripheral device 20 successfully receives the packet 202. Further, the first peripheral device 10 eavesdrops the second isochronous data stream 200 and successfully receives the packet 202. Since the first peripheral device 10 is designated as the acknowledgment device in the second subevent 85, the first peripheral device 10 transmits an acknowledgment 204 to the central device 1. Upon successfully receiving the acknowledgment 204, the central device 1 will not retransmit the packet 202. Further, the second peripheral device 20 eavesdrops on the transmission of the acknowledgment 204, and now knows that the first peripheral device 10 successfully received the packet 202.

During the third subevent 85, packet 102 is retransmitted by the central device 1. Retransmitted packet 102 is designated L2. Even though it successfully received L1 during the first subevent 85, the first peripheral device 10 now successfully receives L2. Further, after failing to receive the packet 102, the second peripheral device 20 now successfully receives L2. However, because the first peripheral device 10 knows the second peripheral device 20 failed to receive L1 during the first subevent 85, the first peripheral device 10 does not transmit an acknowledgment 104 to the central device 1 during the third subevent 85, thus again requiring retransmission of the packet 102 so that the second peripheral device 20 is required to provide an acknowledgment 104 during a future subinterval.

During the fourth subevent, no packets 202 of the second isochronous data stream 200 are transmitted, as successful transmission and receipt of the packet 202 was previously acknowledged during the second subevent.

During the fifth subevent, packet 102 is again retransmitted by the central device 1. Retransmitted packet 102 is designated L3. Even though it successfully received L1 and L2, the first peripheral device 10 now successfully receives L3. Further, despite successfully receiving L2, the second peripheral device 20 now also successfully receives L3. As the second peripheral device 20 is now the acknowledgment device according to the pattern 130, the second peripheral device 20 transmits the acknowledgment to the central device 1. Upon successfully receiving the acknowledgment 104, the central device 1 will not retransmit the packet 102.

Figure 8:
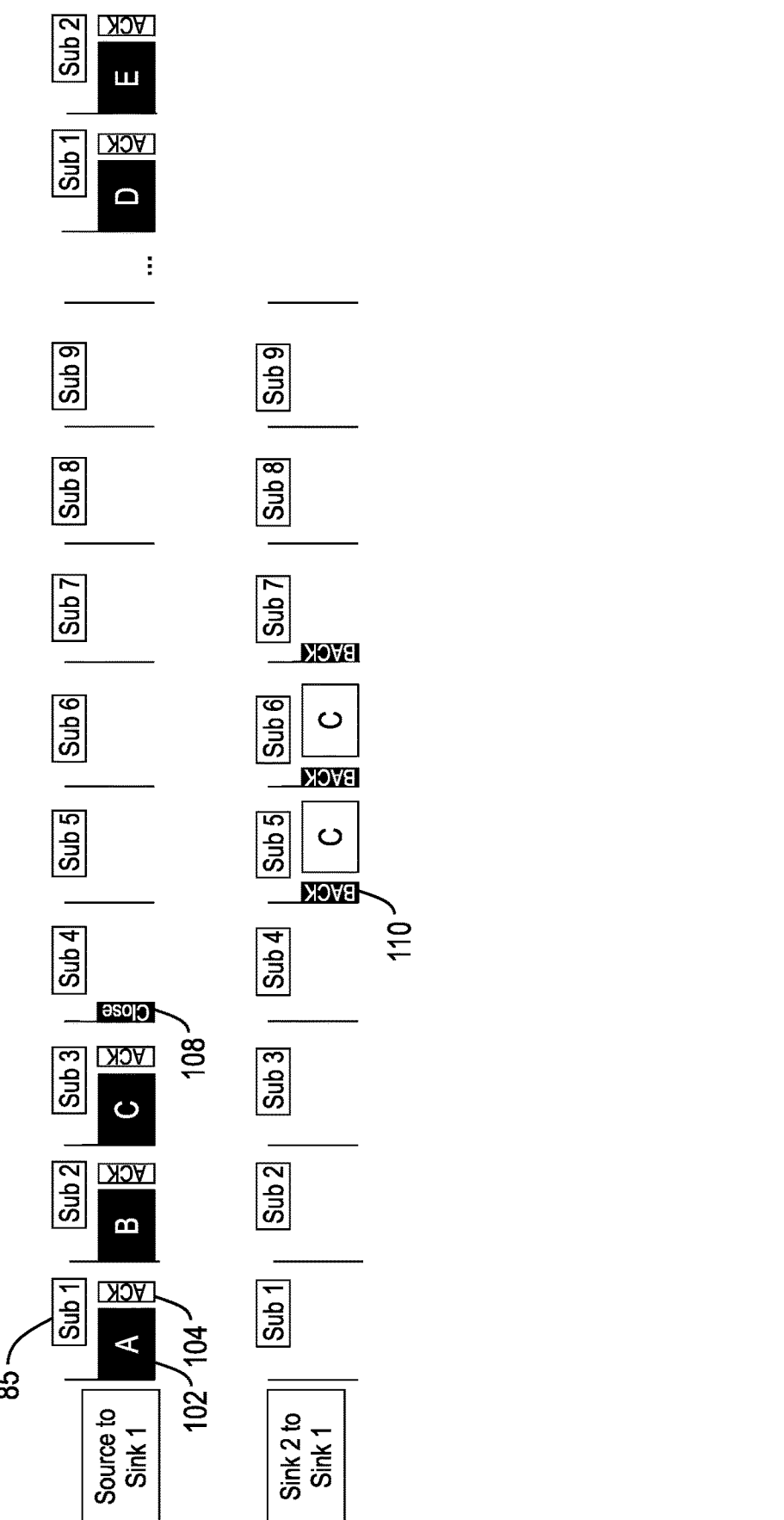
FIG. 8 is a flow diagram of a system configured for wireless packet acknowledgment wherein a first peripheral device retransmits packets, according to a further example.

FIG. 8 is a flow diagram of an acknowledgment scheme wherein one of the peripheral devices 10, 20, rather than the central device 1, retransmit packets 102, 202 based on block acknowledgments 110 transmitted by the other peripheral device 10, 20. Block acknowledgments 110, 210 are an aggregate of the aforementioned acknowledgments 104, 204 and negative acknowledgments 106, 206.

As shown in FIG. 8, the central device 1 transmits, via the first isochronous data stream 100, first packet 102A during the first subinterval 85. The first packet 102A is received by the first peripheral device 10, which transmits a first acknowledgment 104A to the central device 1. The central device 1 then transmits, via the first isochronous data stream 100, second packet 102B during the second subinterval 85. The second packet 102B is received by the first peripheral device 10, which transmits a second acknowledgment 104B to the central device 1. The central device 1 then transmits, via the first isochronous data stream 100, third packet 102C during the third subinterval 85. The third packet 102C is received by the first peripheral device 10, which transmits a third acknowledgment 104C to the central device 1.

Upon receiving all three acknowledgments 104A-C, the central device 1 generates a close event 108 during the fourth subevent 85. The close event 108 triggers the second peripheral device 20 to generate a block acknowledgment 110. While packets 102A-C were transmitted to the first peripheral device 10, the second peripheral device 20 eavesdropped on the first isochronous data stream 100 in an attempt to capture the packets 102A-C. The block acknowledgment 110 aggregates the acknowledgments 104 and negative acknowledgments 106 corresponding to the receipt of these packets 102A-C by the second peripheral device 20. In this case, the second peripheral device 20 successfully received the first and second packets 102A, 102B, but failed to receive the third packet 102C. Accordingly, the block acknowledgment 110 includes acknowledgments 104A, 104B corresponding to the first and second packets 102A, 102B, and a negative acknowledgment 106C corresponding to the third packet 102C.

During the fifth subevent, the second peripheral device 20 transmits the block acknowledgment 110 to the first peripheral device 10. Based on the block acknowledgment 110, the first peripheral device 10 wirelessly transmits the third packet 102C to the second peripheral device 20. However, the second peripheral device 20 again fails to receive the third packet 102C.

Thus, during the sixth subevent, the second peripheral device 20 again transmits the block acknowledgment 110 indicating that the third packet 102C was not successfully received. Based on the block acknowledgment 110, the first peripheral device 10 again wirelessly transmits the third packet 102C to the second peripheral device 20. This time, the second peripheral device 20 successfully receives the third packet 102C, and generates a new block acknowledgment 110 indicating that all of the packets 102A-C were successfully received.

During the seventh subevent, the second peripheral device 20 transmits the updated block acknowledgment 110. Based on the updated block acknowledgment 110, the first peripheral device 10 learns that the second peripheral device has successfully received all of the packets 102A-C, and that further transmission of the packets 102A-C is not required.

Figure 9:
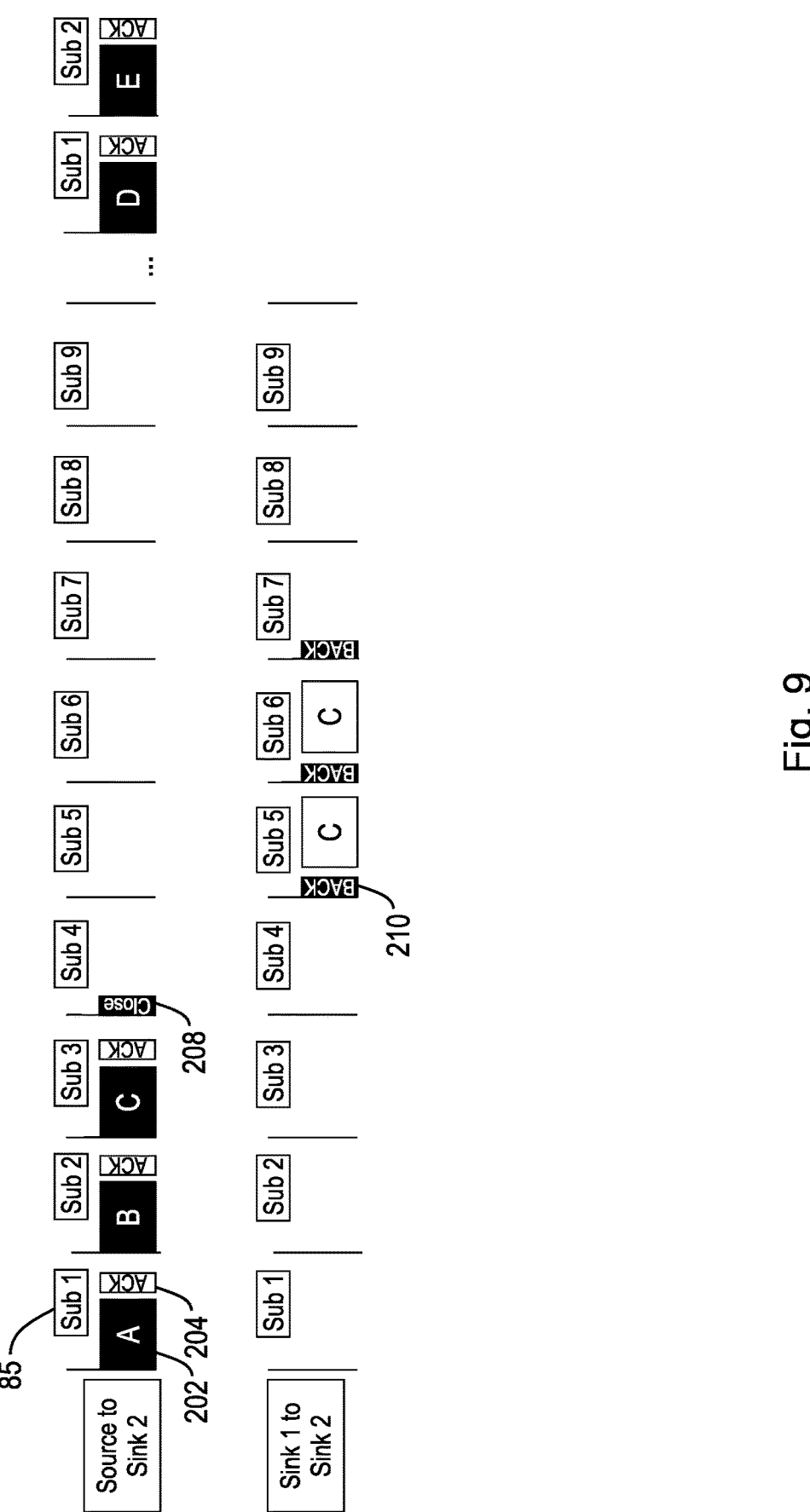
FIG. 9 is a flow diagram of a system configured for wireless packet acknowledgment wherein a second peripheral device retransmits packets, according to a further example.

FIG. 9 is a variation of the scheme of FIG. 8, focused on the second isochronous data stream 200. In FIG. 9, packets 202A-C are transmitted, via the second isochronous data stream 200, to the second peripheral device 20. The first peripheral device 10 attempts to receive the packets 202A-C via eavesdropping. If the first peripheral device 10 is unsuccessful in receiving any of the packets 202A-C, the second peripheral device 20 transmits the missing packets 202A-C to the first peripheral device 10 based on block acknowledgements 210 generated by the first peripheral device 10.

Figure 10:
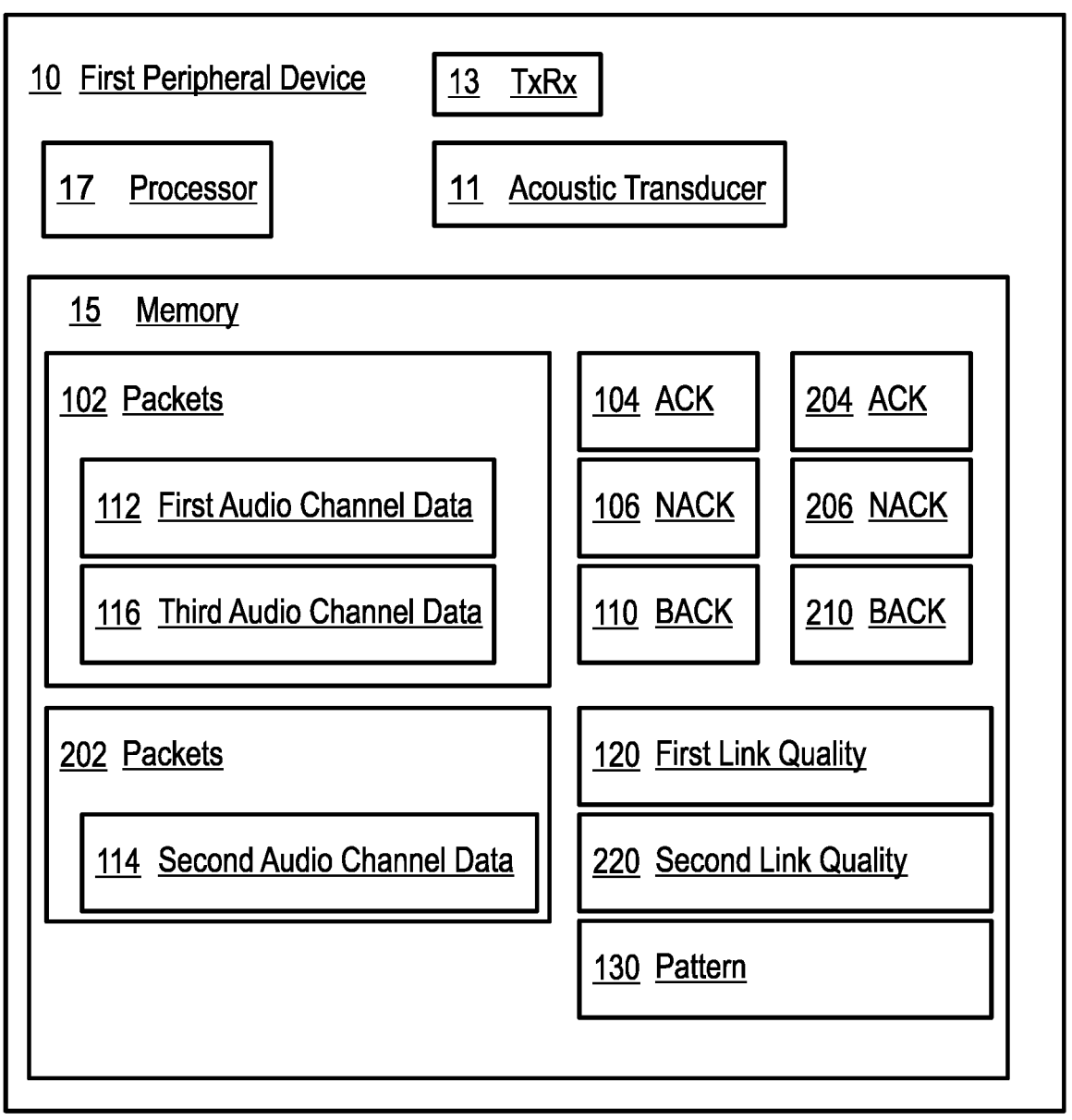
FIG. 10 is a schematic diagram of a first peripheral device, according to an example.

FIG. 10 is a schematic diagram of the first peripheral device 10. The first peripheral device 10 includes an acoustic transducer 11, a transceiver 13 (such as a Bluetooth transceiver), a memory 15, and a processor 17. The memory 15 stores a variety of data, including packets 102, 202, acknowledgments 104, 204, negative acknowledgments 106, 206, block acknowledgments 110, 210, link quality measurements 120, 220, and patterns 130 of acknowledgment.

Figure 11:
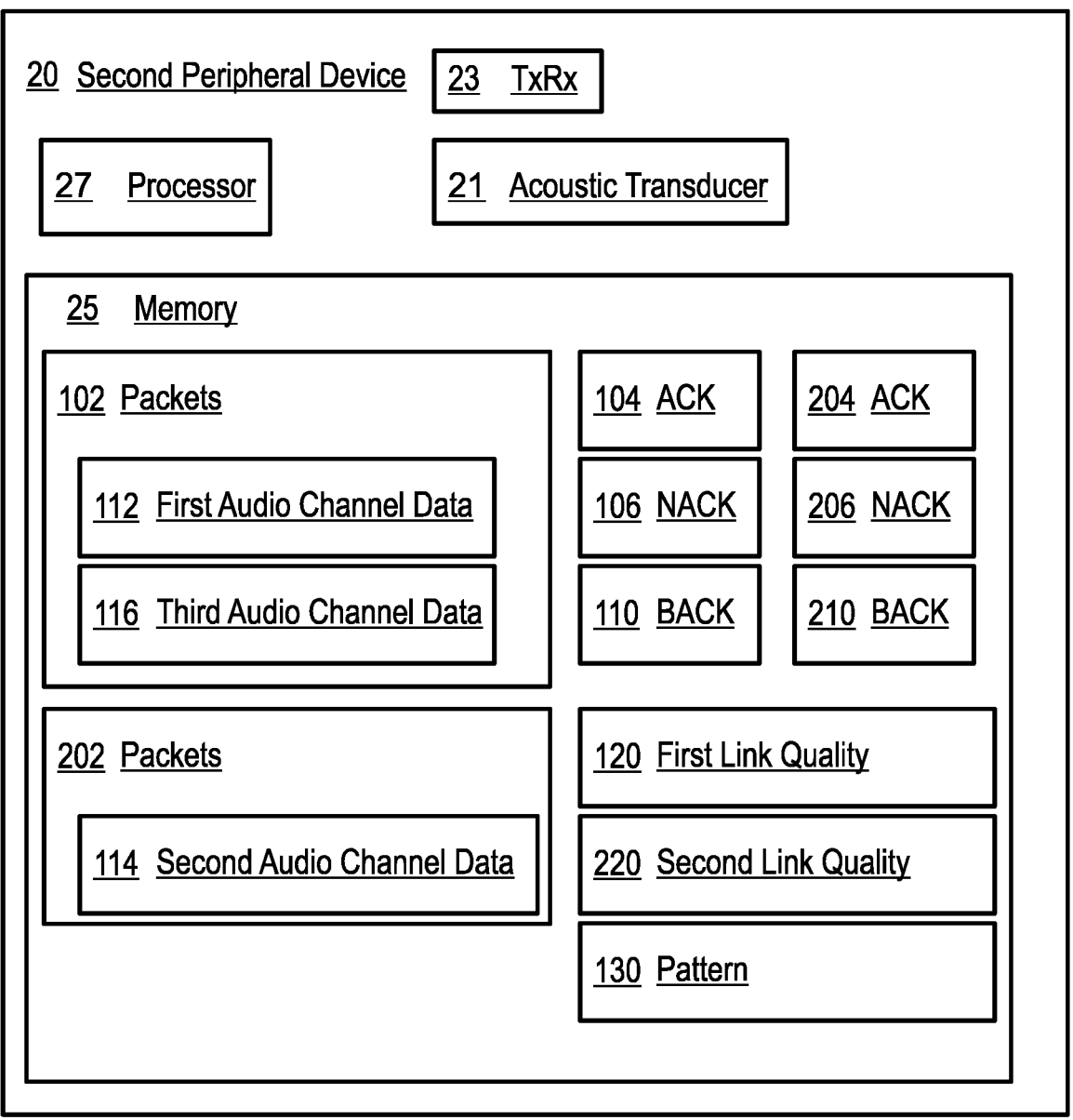
FIG. 11 is a schematic diagram of a second peripheral device, according to an example.

FIG. 11 is a schematic diagram of the second peripheral device 20. The second peripheral device 20 includes an acoustic transducer 21, a transceiver 23 (such as a Bluetooth transceiver), a memory 25, and a processor 27. The memory 25 stores a variety of data, including packets 102, 202, acknowledgments 104, 204, negative acknowledgments 106, 206, block acknowledgments 110, 210, link quality measurements 120, 220, and patterns 130 of acknowledgment.

FIG. 12 is a flow chart of a method 500 of acknowledgment of wireless data packets. The method 500 includes receiving 502, from a central device at a first peripheral device, a first isochronous data stream intended to be received by the first peripheral device. The method 500 further includes receiving 504, from a central device at a second peripheral device, a second isochronous data stream intended to be received by the second peripheral device. The method 500 further includes eavesdropping 506, via the second peripheral device, the first isochronous data stream in an attempt to receive a packet of the first isochronous data stream. The method 500 further includes sending 508, from the second peripheral device, an acknowledgment or a negative acknowledgment based on whether the packet was received by the second peripheral device.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of acknowledgment of wireless data packets, comprising:
   receiving, from a central device, by a first peripheral device, a first isochronous data stream intended to be received by the first peripheral device;
   receiving, from the central device, by a second peripheral device, a second isochronous data stream intended to be received by the second peripheral device, wherein the first isochronous data stream and the second isochronous data stream switch conveying one or more packets according to a series of subevents of a connected isochronous stream (CIS) interval;
   receiving, from the central device, by the second peripheral device, a first link quality between the central device and the first peripheral device;
   determining, via the second peripheral device, a second link quality between the central device and the second peripheral device;
   selecting either the first peripheral device or the second peripheral device as an acknowledgment device by comparing the first link quality to the second link quality, wherein the second peripheral device is selected as the acknowledgment device when the second link quality is less than the first link quality;
   eavesdropping, via the second peripheral device, the first isochronous data stream in an attempt to receive a packet of the first isochronous data stream; and
   sending, from the second peripheral device to the central device, an acknowledgment after the packet has been received by the second peripheral device when the second peripheral device is selected as the acknowledgment device.

2. The method of claim 1, further comprising sending, from the second peripheral device, a negative acknowledgment in response to the second peripheral device failing to receive the packet.

3. The method of claim 1, further comprising not sending, from the second peripheral device, the acknowledgment in response to the second peripheral device failing to receive the packet.

4. The method of claim 1, wherein the first isochronous data stream includes first audio channel data and the second isochronous data stream includes second audio channel data.

5. The method of claim 4, wherein the second audio channel data is different from the first audio channel data.

6. The method of claim 4, wherein the first audio channel data relates to one of a left channel or a right channel of a stereo pair, and the second audio channel data relates to the other of the left channel or the right channel of the stereo pair.

7. The method of claim 4, wherein the first audio channel data is not included in the second isochronous data stream.

8. The method of claim 4, wherein the first isochronous data stream further includes third audio channel data.

9. The method of claim 8, wherein the first audio channel data, the second audio channel data, and the third audio channel data each relate to one of a plurality of audio channels of a surround sound system.

10. The method of claim 1, wherein the first isochronous data stream and the second isochronous data stream are each a Bluetooth Low Energy (LE) Audio Connected Isochronous data stream (CIS).

11. The method of claim 1, wherein the sending of the acknowledgment is in place of an acknowledgment being sent from the first peripheral device to the central device.

12. The method of claim 1, wherein the sending of the acknowledgment is further based on a pattern wherein the first peripheral device and the second peripheral device alternate sending an acknowledgment.

13. The method of claim 12, wherein the pattern alternates after every one, two, or three packet transmission subevents.

14. The method of claim 1, wherein the sending of the acknowledgment is from the second peripheral device to the first peripheral device.

15. The method of claim 14, further comprising sending, from the second peripheral device, a negative acknowledgment to the first peripheral device in response to the second peripheral device failing to receive the packet, wherein, in response to the negative acknowledgment, the first peripheral device retransmits the packet to the second peripheral device.

16. The method of claim 1, wherein the first peripheral device is a left earbud, and the second peripheral device is a right earbud.

17. A system including a first peripheral device and a second peripheral device, the system comprising:
   at least one processor and memory of the first peripheral device configured to cause the first peripheral device to receive, from a central device, a first isochronous data stream intended to be received by the first peripheral device; and
   at least one processor and memory of the second peripheral device configured to cause the second peripheral device to
   receive, from a central device, a second isochronous data stream intended to be received by the second peripheral device, wherein the first isochronous data stream and the second isochronous data stream switch conveying one or more packets according to a series of subevents of a connected isochronous stream (CIS) interval,
   receive, from the central device, a first link quality between the central device and the first peripheral device;
   determine a second link quality between the central device and the second peripheral device;
   select either the first peripheral device or the second peripheral device as an acknowledgment device by comparing the first link quality to the second link quality, wherein the second peripheral device is selected as the acknowledgment device when the second link quality is less than the first link quality;

eavesdrop the first isochronous data stream in an attempt to receive a packet of the first isochronous data stream, and send, to the central device, an acknowledgment after the packet has been received when the second peripheral device is selected as the acknowledgment device.

18. The system of claim 17, wherein the acknowledgment is sent from the second peripheral device to the first peripheral device.

\* \* \* \* \*